United States Patent [19]

Sueyoshi et al.

[11] 4,390,361

[45] Jun. 28, 1983

[54] PROCESS FOR PREPARING FERROMAGNETIC PARTICLES COMPRISING METALLIC IRON

[75] Inventors: Toshinobu Sueyoshi, Kyoto; Shigeo Hirai, Shiga; Masahiro Amemiya, Osaka, all of Japan

[73] Assignee: Hitachi Maxell, Ltd., Osaka, Japan

[21] Appl. No.: 272,722

[22] Filed: Jun. 11, 1981

[30] Foreign Application Priority Data

| | | | |
|---|---|---|---|
| Jun. 11, 1980 | [JP] | Japan | 55/79417 |
| Jun. 11, 1980 | [JP] | Japan | 55/79418 |
| Jul. 11, 1980 | [JP] | Japan | 55/95403 |

[51] Int. Cl.[3] .......... B22F 1/00; A01F 1/02

[52] U.S. Cl. .......... 75/0.5 BA; 148/105; 428/403; 428/404; 428/405

[58] Field of Search .......... 75/0.5 A, 0.5 AA, 0.5 BA; 148/105; 252/62.56; 428/379, 900, 384, 380, 387, 389, 390, 403, 404, 405, 406

[56] References Cited

U.S. PATENT DOCUMENTS

| | | | |
|---|---|---|---|
| 3,520,676 | 7/1970 | Stahr | 148/105 |
| 3,748,119 | 7/1973 | Hwang et al. | 75/0.5 BA |
| 3,846,118 | 11/1974 | Ehrreich et al. | 75/0.5 AA |
| 4,133,677 | 1/1979 | Matsui et al. | 148/105 |
| 4,207,092 | 6/1980 | Berry | 75/0.5 AA |
| 4,274,865 | 6/1981 | Suzuki et al. | 75/0.5 AA |
| 4,290,799 | 9/1981 | Schroeder et al. | 75/251 |

FOREIGN PATENT DOCUMENTS

| | | | |
|---|---|---|---|
| 52-30758 | 3/1977 | Japan | 75/0.5 BA |
| 55-33091 | 3/1980 | Japan | 252/62.56 |

*Primary Examiner*—Michael L. Lewis
*Attorney, Agent, or Firm*—Birch, Stewart, Kolasch & Birch

[57] ABSTRACT

A process for preparing ferromagnetic iron particles comprising metallic iron as the major component by reduction of particles of an iron oxide under heating, characterized in that the iron oxide particles are provided with a first coating layer containing at least one metal compound chosen from compounds of aluminum, zinc and alkaline earth metals at the surfaces and a second coating layer containing at least one silicon compound thereon before the reduction, whereby the coated particles are prevented from sintering and breaking upon reduction so as to give ferromagnetic particles of metallic iron having excellent magnetic characteristics.

12 Claims, No Drawings

PROCESS FOR PREPARING FERROMAGNETIC PARTICLES COMPRISING METALLIC IRON

The present invention relates to a process for preparing ferromagnetic particles comprising metallic iron. More particularly, it relates to a process for preparing ferromagnetic particles of metallic iron having excellent magnetic characteristics while preventing the particles from sintering and breaking.

In general, ferromagnetic particles comprising metallic iron as the major component have better magnetic characteristics than ferromagnetic particles of iron oxide such as $Fe_3O_4$ or $\gamma$-$Fe_2O_3$ and are used as recording elements for magnetic recording media such as magnetic recording tapes. While the ferromagnetic particles of metallic iron are usually prepared by reduction of needle-shaped particles of an iron oxide such as $\alpha$-FeOOH or $\alpha$-$Fe_2O_3$ under heating, the heat treatment of the iron oxide particles for reduction tends to cause sintering between the particles, partial melting of each particle, formation of micropores, etc., whereby the evenness of the particle size, the needle-shape of the particles and the density of the particles become inferior so that the magnetic characteristics and the mechanical strength of the ferromagnetic particles are markedly deteriorated.

As a result of an extensive study to overcome the said problem on the heat treatment of particles of an iron oxide for reduction, it has been found that the provision of those particles with a first coating layer of at least one metal compound chosen from aluminum, zinc and alkaline earth metals at the surfaces and a second coating layer of at least one silicon compound thereon before the said heat treatment can prevent them from sintering and breaking, whereby ferromagnetic particles of metallic iron of excellent magnetic characteristics are obtained.

According to the present invention, there is provided a process for preparing ferromagnetic particles comprising metallic iron as the major component by reduction of particles of an iron oxide under heating, characterized in that the iron oxide particles are provided with a first coating layer containing at least one metal compound chosen from compounds of aluminum, zinc and alkaline earth metals at the surfaces and a second coating layer containing at least one silicon compound thereon before the reduction step, whereby the coated particles are prevented from sintering and breaking during reduction so as to give ferromagnetic particles of metallic iron having excellent magnetic characteristics.

The iron oxide particles to be reduced may be particles of $\alpha$-FeOOH, $\alpha$-$Fe_2O_3$, $\gamma$-$Fe_2O_3$, $Fe_3O_4$, etc. Among them, $\alpha$-FeOOH particles, particularly containing nickel are favorable, because they have an even size and scarecely contain branched particles and, when reduced under heating as such or after being dehydrated under heating to $\alpha$-$Fe_2O_3$, can be effectively prevented from sintering and breaking so as to give ferromagnetic particles of metallic iron having excellent magnetic characteristics.

For preparation of $\alpha$-FeOOH particles containing nickel, nickel hydroxide may be added to an aqueous suspension of ferrous hydroxide and oxidized with gaseous oxygen in an alkaline medium, optionally followed by controlling the pH so as to coprecipitate ferrous hydroxide and nickel hydroxide. In an alternative way, a water-soluble nickel salt may be added to an aqueous suspension of ferrous hydroxide, optionally followed by controlling the pH, whereby ferrous hydroxide and nickel hydroxide are coprecipitated. In another alternative way, an alkali may be added to an aqueous solution of a water-soluble iron compound containing a water-soluble nickel compound so that ferrous hydroxide and nickel hydroxide are coprecipitated. The amount of the nickel component (Ni) in the $\alpha$-FeOOH particles may be such that the atomic ratio of the nickel component and the iron component (Fe) therein is 0.001–0.15:1.

As the metal compound, there may be used any one chosen from aluminum compounds such as aluminum sulfate, aluminum nitrate, aluminum chloride and sodium aluminate, zinc compounds such as zinc sulfate, zinc nitrate, zinc chloride, zinc hydroxide and zinc oxide, and alkaline earth metal compounds such as alkaline earth metal sulfate, alkaline earth metal nitrate, alkaline earth metal chloride, alkaline earth metal hydroxide and alkaline earth metal oxide. Examples of the alkaline earth metal are magnesium, calcium, etc. The amount of the metal compound may be such that the weight ratio of the metal component (Me) therein to the iron component (Fe) in the iron oxide may be from 0.0001 to 0.05. When it is less than the lower limit, no material effect is produced. When it is more than the higher limit, unfavorable influences are given on the magnetic characteristiscs.

As the silicon compound, there may be used sodium orthosilicate, sodium metasilicate, potassum metasilicate, waterglass, silicic sol, silica, silicone oil, etc. The amount of the silicon compound may be such that the weight ratio of the silicon component (Si) therein to the iron component (Fe) in the iron oxide may be from 0.001 to 0.1, preferably from 0.003 to 0.02. When it is less than the lower limit, no significant effect is produced. When it is more than the upper limit, the saturation magnetization ($\sigma s$) of the ferromagnetic particles of metallic iron as the ultimate product tends to be lowered.

For the formation of the first coating layer containing the metal compound on the surfaces of the iron oxide particles, there may be adopted various procedures, of which a typical example comprises dispersing the iron oxide particles in an aqueous solution of the metal compound so as to make the particles of the metal compound adsorb onto the iron oxide particles. Another typical procedure comprises adding an alkali to an aqueous dispersion of the iron oxide particles containing the metal compound to produce hydroxides of iron and the metal, and blowing carbon dioxide gas therein or adding an acid therein for neutralization, optionally followed by collecting the resulting particles and heating them in the air.

The formation of the second coating layer containing the silicon compound may be carried out in substantially the same manner as above.

After the formation of the first coating layer and/or the second coating layer, the resulting iron oxide particles may be heated at a temperature of 150° to 600° C. By such heat treatment, the metal ocmponent and/or the silicon compound are converted into forms not readily soluble into an aqueous medium, and the coating layers thereby become dense.

The iron oxide particles provided with the first coating layer and the second coating layer are then subjected to heat treatment in a reductive atmosphere such as hydrogen, usually at a temperature of 300° to 600° C., for reduction.

Practical and presently preferred embodiments of the invention are illustratively shown in the following Examples.

EXAMPLE 1

To a suspension of α-FeOOH particles (average long axis, 0.5μ; axis ratio, 20/1) (10 g) in water (800 ml), a mixture of 1 N NaOH aqueous solution (100 ml) and an aqueous solution (10 ml) containing aluminum sulfate (0.01 mol/liter) was added, and carbon dioxide gas was blown therein while stirring to make a pH of 6 to 8. The precipitated particles were collected, washed with water and dried to give α-FeOOH particles having aluminum hydroxide deposited on the surfaces. The particles were heated in an electric furnace at 300° C. for 2 hours for dehydration to obtain particles of α-$Fe_2O_3$ having a first coating layer of aluminum oxide at the surfaces.

The above obtained α-$Fe_2O_3$ particles were dispersed in water (800 ml), 1 N NaOH aqueous solution (50 ml) and an aqueous solution (10 ml) containing sodium orthosilicate (1 mol/liter) were added thereto, and carbon dioxide gas was blown therein while stirring to make a pH of not more than 8, whereby silicic acid sol was deposited on the surfaces of the particles. The particles were collected, washed with water and dried to obtain particles of α-$Fe_2O_3$ having a first coating layer of aluminum oxide and a second coating layer of silicic acid.

The above obtained α-$Fe_2O_3$ particles were reduced by heating in an electric furnace at 500° C. in a stream of hydrogen at a rate of 1 liter/minute for 2 hours to give ferromagnetic particles of metallic iron containing aluminum and silicon.

EXAMPLE 2

In the same manner as in Example 1 except that the dehydration was carried out at 500° C. and the reduction was carried out at 400° C., the operations were effected to give ferromagnetic particles of metallic iron containing aluminum and silicon.

EXAMPLE 3

To a suspension of α-$Fe_2O_3$ particles (average long axis, 0.5μ; axis ratio, 20/1) (9 g) in water (800 ml), a mixture of 1 N NaOH aqueous solution (100 ml) and an aqueous solution (10 ml) containing aluminum sulfate (0.01 mol/liter) was added, and carbon dioxide gas was blown therein while stirring to make a pH of 6 to 8. The precipitated particles were collected, washed with water and dried and heated in an electric furnace at 250° C. for 2 hours to obtain particles of α-$Fe_2O_3$ having a first coating layer of hydrated aluminum oxide at the surfaces.

The above obtained α-$Fe_2O_3$ particles were dispersed in water (800 ml), 1 N NaOH aqueous solution (50 ml) and an aqueous solution (10 ml) containing sodium orthosilicate (1 mol/liter) were added thereto, and carbon dioxide gas was blown therein while stirring to make a pH of not more than 8, whereby silicic acid sol was deposited on the surfaces of the particles. The particles were collected, washed with water and dried to obtain particles of α-$Fe_2O_3$ having a first coating layer of hydrated aluminum oxide and a second coating layer of silicic acid.

The above obtained α-$Fe_2O_3$ particles were reduced by heating in an electric furnace at 500° C. in a stream of hydrogen at a rate of 1 liter/minute for 2 hours to give ferromagnetic particles of metallic iron containing aluminum and silicon.

EXAMPLE 4

α-$Fe_2O_3$ particles having a first coating layer of aluminum oxide obtained in Example 1 (9 g) were dispersed in a solution of silicone oil (dimethylpolysiloxane; "KF-96" manufactured by Shinetsu Kagaku Kogyo K.K.; 100 c.s.) (0.4 g) in methylethylketone (800 ml). The dispersion was filtered, and the collected particles were dried. The dried particles were reduced by heating in an electric furnace at 500° C. in a stream of hydrogen at a rate of 1 liter/minute for 2 hours to give ferromagnetic particles of metallic iron containing aluminum and silicon.

EXAMPLE 5

To a suspension of α-FeOOH particles (average long axis, 0.5μ; axis ratio, 20/1) (10 g) in water (800 ml), a mixture of 1 N NaOH aqueous solution (100 ml) and an aqueous solution (10 ml) containing zinc sulfate (1 mol/liter) was added, and carbon dioxide gas was blown therein while stirring to make a pH of 7 to 8. The precipitated particles were collected, washed with water and dried to give α-FeOOH particles having zinc hydroxide deposited on the surfaces. The particles were heated in the air at 300° C. for 2 hours for dehydration to obtain particles of α-$Fe_2O_3$ having a first coating layer of zinc oxide at the surfaces.

The above obtained α-$Fe_2O_3$ particles were dispersed in water (800 ml), 1 N NaOH aqueous solution (50 ml) and an aqueous solution (20 ml) containing $Na_4SiO_4$ (1 mol/liter) were added thereto, and carbon dioxide gas was blown therein while stirring to make a pH of 7 to 8, whereby silicic acid sol was deposited on the surfaces of the particles. The particles were collected, washed with water and dried to obtain particles of α-$Fe_2O_3$ having a first coating layer of zinc oxide and a second coating layer of silica.

The above obtained α-$Fe_2O_3$ particles were reduced by heating in an electric furnace at 500° C. in a stream of hydrogen at a rate of 1 liter/minute for 2 hours to give ferromagnetic particles of metallic iron containing zinc and silicon.

EXAMPLE 6

To a suspension of α-FeOOH particles (average long axis, 0.5μ; axis ratio, 20/1) (10 g) in water (800 ml), an aqueous solution (10 ml) containing magnesium sulfate (0.01 mol/liter) was added, and 1 N NaOH aqueous solution (50 ml) was added thereto while stirring. The precipitated particles were collected, washed with water and dried to give α-FeOOH particles having magnesium hydroxide deposited on the surfaces. The particles were heated in an electric furnace at 300° C. for 2 hours for dehydration to obtain particles of α-$Fe_2O_3$ having a first coating layer of magnesium oxide at the surfaces.

The above obtained α-$Fe_2O_3$ particles were dispersed in water (800 ml), 1 N NaOH aqueous solution (50 ml) and an aqueous solution (10 ml) containing sodium orthosilicate (1 mol/liter) were added thereto, and carbon dioxide gas was blown therein while stirring to make a pH of not more than 8, whereby silicic acid sol was deposited on the surfaces of the particles. The particles were collected, washed with water and dried to obtain particles of α-$Fe_2O_3$ having a first coating layer of magnesium oxide and a second coating layer of silicic acid.

The above obtained $\alpha$-$Fe_2O_3$ particles were reduced by heating in an electric furnace at 500° C. in a stream of hydrogen at a rate of 1 liter/minute for 2 hours to give ferromagnetic particles of metallic iron containing magnesium and silicon.

EXAMPLE 7

In the same manner as in Example 6 except that an aqueous solution (10 ml) containing calcium sulfate (0.01 mol/liter) was used in place of an aqueous solution (10 ml) containing magnesium sulfate (0.01 mol/liter), the operations were effected to give ferromagnetic particles of metallic iron containing calcium and silicon.

EXAMPLE 8

To a suspension of $\alpha$-FeOOH particles (average long axis, 0.5μ; axis ratio, 20/1) (10 g) in water (800 ml), an aqueous solution (4 ml) containing magnesium sulfate (0.01 mol/liter) and an aqueous solution (10 ml) containing $Na_4SiO_4$ (1 mol/liter) were added, and 1 N NaOH aqueous solution (50 ml) was added thereto while stirring, whereby $\alpha$-FeOOH particles having magnesium hydroxide deposited on the surfaces were produced. Then, carbon dioxide gas was blown therein while stirring to make a pH of 6 to 8, whereby silicic acid sol was deposited on the surfaces of the particles. The particles were collected, washed with water and dried, followed by heating in the air at 300° C. for 2 hours for dehydration to obtain particles of $\alpha$-$Fe_2O_3$ having a first coating layer of magnesium oxide and a second coating layer of silica.

The above obtained $\alpha$-$Fe_2O_3$ particles were reduced by heating in an electric furnace at 500° C. in a stream of hydrogen at a rate of 1 liter/minute for 2 hours to give ferromagnetic particles of metallic iron containing magnesium and silicon.

EXAMPLE 9

To a suspension of $\alpha$-$Fe_2O_3$ particles (average long axis, 0.5μ; axis ratio, 20/1) (9 g) in water (800 ml), an aqueous solution (3 ml) containing calcium nitrate (0.01 mol/liter) and an aqueous solution (10 ml) containing $Na_4SiO_4$ (1 mol/liter) were added, and 1 N NaOH aqueous solution (50 ml) was added thereto while stirring, whereby $\alpha$-$Fe_2O_3$ particles having calcium hydroxide deposited on the surfaces were produced. Then, carbon dioxide gas was blown therein while stirring to make a pH of 6 to 8, whereby silicic acid sol was deposited on the surfaces of the particles. The particles were collected, washed with water and dried to obtain particles of $\alpha$-$Fe_2O_3$ having a first coating layer of calcium hydroxide and a second coating layer of silicic acid.

The above obtained $\alpha$-$Fe_2O_3$ particles were reduced by heating in an electric furnace at 500° C. in a stream of hydrogen at a rate of 1 liter/minute for 2 hours to give ferromagnetic particles of metallic iron containing calcium and silicon.

EXAMPLE 10

To an aqueous solution (1.5 liters) containing $FeSO_4.7H_2O$ (200 g/liter), a solution (0.1 liter) containing $NiSO_4.6H_2O$ (114 g/liter) and an aqueous solution (1.5 liters) containing NaOH (200 g/liter) were added to make a suspension containing the co-precipitate of $Fe(OH)_2$ and $Ni(OH)_2$, of which the pH was more than 12. The suspension was warmed to 40° C., and air was introduced therein at a rate of 1.6 liters/minute for 10 hours, whereby particles of $\alpha$-FeOOH containing nickel in a needle-shape were separated out. The $\alpha$-FeOOH particles were collected, washed with water and dried.

Ten grams of the $\alpha$-FeOOH particles were dispersed in water (0.8 liter), 1 N NaOH aqueous solution (100 ml) and an aqueous solution (5 ml) containing $ZnSO_4$ (1 mol/liter) were added thereto while stirring, and carbon dioxide gas was blown into the resultant mixture to make a pH of 7 to 8, whereby particles of $\alpha$-FeOOH having zinc hydroxide deposited thereon were precipitated. The precipitated particles were collected, washed with water and dried, followed by heating at 300° C. in the air for 2 hours for dehydration.

The above obtained $\alpha$-$Fe_2O_3$ particles were dispersed in water (800 ml), 1 N NaOH aqueous solution (100 ml) and an aqueous solution (20 ml) containing $Na_4SiO_4$ (1 mol/liter) were added thereto, and carbon dioxide gas was blown therein while stirring to make a pH of 7 to 8, whereby silicic acid sol was deposited on the surfaces of the particles. The particles were collected, washed with water and dried to obtain particles of $\alpha$-$Fe_2O_3$ having a first coating layer of zinc oxide (Zn/Fe=4.9% by weight) and a second coating layer of silica (Si/Fe=2% by weight).

The above obtained $\alpha$-$Fe_2O_3$ particles were reduced by heating in an electric furnace in a stream of hydrogen at a rate of 1 liter/minute under the conditions as specified in Table 1 to give ferromagnetic particles of metallic iron containing nickel, zinc and silicon.

TABLE 1

| No. | Reduction conditions | |
|---|---|---|
| | Temperature (°C.) | Time (hour) |
| a | 350 | 4 |
| b | 400 | 3 |
| c | 450 | 2 |
| d | 500 | 1 |

COMPARATIVE EXAMPLE 1

To a suspenion of $\alpha$-FeOOH particles (average long axis, 0.5μ; axis ratio, 20/1) (10 g) in water (800 ml), 1 N NaOH aqueous solution (100 ml), an aqueous solution (10 ml) containing aluminum sulfate (0.01 mol/liter) and an aqueous solution (10 ml) containing sodium orthosilicate (1 mol/liter) were added, and carbon dioxide gas was blown therein while stirring to make a pH of not more than 8. The precipitated particles were collected, washed with water and dried to obtain partilces of $\alpha$-FeOOH having a coating layer of aluminum hydroxide and silicic acid at the surfaces. The particles were heated under the same conditions as in Example 1 for dehydration and then heated under the same conditions as in Example 1 for reduction to give ferromagnetic particles of metallic iron containing aluminum and silicon.

COMPARATIVE EXAMPLE 2

In the same manner as in Comparative Example 1 except that an aqueous solution (5 ml) containing zinc sulfate (1 mol/liter) was used in place of an aqueous solution (10 ml) containing aluminum sulfate (0.01 mol/liter), the operations were effected to give ferromagnetic particles of metallic iron containing zinc and silicon.

COMPARATIVE EXAMPLE 3

In the same manner as in Example 1 except that the treatment for application of the silicon compound was carried out before the dehydration under heating and the treatment for application of the aluminum compound was carried out after such dehydration, the operations were effected to give ferromagnetic particles of metallic iron containing aluminum and silicon.

COMPARATIVE EXAMPLE 4

In the same manner as in Example 5 except that the treatment for application of the silicon compound was carried out before the dehydration under heating and the treatment for application of the zinc compound was carried out after such dehydration, the operations were effected to give ferromagnetic particles of metallic iron containing zinc and silicon.

COMPARATIVE EXAMPLE 5

In the same manner as in Example 6 except that the treatment for application of the silicon compound was carried out before the dehydration under heating and the treatment for application of the magnesium compound was carried out after such dehydration, the operations were effected to give ferromagnetic particles of metallic iron containing magnesium and silicon.

COMPARATIVE EXAMPLE 6

In the same manner as in Example 7 except that the treatment for application of the silicon compound was carried out before the dehydration under heating and the treatment for application of the calcium compound was carried out after such dehydration, the operations were effected to give ferromagnetic particles of metallic iron containing calcium and silicon.

COMPARATIVE EXAMPLE 7

In the same manner as in Example 8 except that the aqueous solution of $Na_4SiO_4$ was not used and the blowing of carbon dioxode gas was not effected, the operations were effected to give ferromagnetic particles of metallic iron containing magnesium.

COMPARATIVE EXAMPLE 8

In the same manner as in Example 9 except that the aqueous solution of $Na_4SiO_4$ was not used and the blowing of carbon dioxide gas was not effected, the operations were effected to give ferromagnetic particles of metallic iron containing calcium.

COMPARATIVE EXAMPLE 9

In the same manner as in Example 1 except that the aqueous solution of aluminum sulfate was not used, the operations were effected to give ferromagnetic particles of metallic iron containing silicon.

COMPARATIVE EXAMPLE 10

In the same manner as in Comparative Example 1 except that the aqueous solution of aluminum sulfate was not used, the operations were effected to give ferromagnetic particles of metallic iron containing silicon.

The ferromagnetic particles of metallic iron as prepared in the foregoing Examples and Comparative Examples were subjected to measurement of coercive force (Hc), saturation magnetization ($\sigma s$), square ratio ($\sigma r/\sigma s$), average long axis and axis ratio. The results are shown in Table 2.

TABLE 2

| | Coercive force (Oe) | Saturation magnetization (emu/g) | Square ratio | Average long axis (μm) | Axis ratio |
|---|---|---|---|---|---|
| Example | | | | | |
| 1 | 1320 | 148 | 0.52 | 0.3 | 15 |
| 2 | 1380 | 158 | 0.52 | 0.3 | 16 |
| 3 | 1330 | 162 | 0.51 | 0.3 | 16 |
| 4 | 1300 | 165 | 0.52 | 0.3 | 15 |
| 5 | 1320 | 162 | 0.51 | 0.3 | 15 |
| 6 | 1280 | 165 | 0.51 | 0.3 | 13 |
| 7 | 1290 | 163 | 0.52 | 0.3 | 14 |
| 8 | 1280 | 165 | 0.50 | 0.3 | 10 |
| 9 | 1290 | 166 | 0.50 | 0.4 | 10 |
| 10 (a) | 1285 | 120 | 0.48 | 0.3 | 13 |
| 10 (b) | 1390 | 137 | 0.48 | 0.3 | 13 |
| 10 (c) | 1450 | 147 | 0.50 | 0.3 | 13 |
| 10 (d) | 1410 | 160 | 0.50 | 0.3 | 13 |
| Comparative Example | | | | | |
| 1 | 1200 | 154 | 0.51 | 0.3 | 10 |
| 2 | 1190 | 168 | 0.51 | 0.3 | 10 |
| 3 | 580 | 158 | 0.22 | 0.4 | 3 |
| 4 | 630 | 162 | 0.23 | 0.3 | 4 |
| 5 | 500 | 163 | 0.24 | 0.4 | 3 |
| 6 | 570 | 165 | 0.19 | 0.3 | 3 |
| 7 | 500 | 175 | 0.35 | 0.3 | 3 |
| 8 | 550 | 177 | 0.32 | 0.4 | 3 |
| 9 | 1100 | 165 | 0.46 | 0.4 | 8 |
| 10 | 1180 | 155 | 0.50 | 0.3 | 10 |

As understood from the above results, the process of this invention can efficiently prevent the sintering and breaking of the particles on the heat treatment for reduction. As a result, the produced ferromagnetic particles of metallic iron exhibit excellent magnetic characteristics.

What is claimed is:

1. A process for preparing ferromagnetic iron particles comprising metallic iron as the major component by reduction of particles of an iron oxide under heating, said process comprising:
   - providing iron oxide particles with a first coating layer containing at least one metal compound selected from the group consisting of aluminum compounds, zinc compounds and alkaline earth metal compounds;
   - providing the thus prepared metal compound coated particles with a second coating layer containing at least one silicon compound; and
   - subjecting the thus prepared coated particles to reduction under heating.

2. The process according to claim 1, wherein the iron oxide particles are particles of $\alpha$-FeOOH.

3. The process according to claim 1, wherein the iron oxide particles are particles of $\alpha$-$Fe_2O_3$.

4. The process according to claim 1, wherein the metal compound is an aluminum compound.

5. The process according to claim 1, wherein the metal compound is a zinc compound.

6. The process according to claim 1, wherein the reduction is effected at a temperature of not lower than 150° C.

7. The process according to claim 1, wherein the iron oxide particles contain nickel.

8. The process according to claim 7, wherein the atomic ratio of the nickel component and the iron component is 0.001–0.15:1.

9. The process according to claim 1, wherein the weight ratio of the metal component in the metal compound and the iron component in the iron oxide is 0.0001–0.05:1.

10. The process according to claim 1, wherein the weight ratio of the silicon component in the silicon compound and the iron component in the iron oxide is 0.001–0.1:1.

11. The process according to claim 12, wherein the iron oxide particles are particles of $\alpha$-FeOOH, and the $\alpha$-FeOOH particles are first provided with said first coating layer, then heated for dehydration of $\alpha$-FeOOH to $\alpha$-$Fe_2O_3$, and then provided with said second coating layer prior to subjecting the particles to reduction.

12. A ferromagnetic iron particle comprising:

an iron oxide particle having coated thereon a first coating layer and an outer second coater layer;

said first coating layer containing at least one metal compound selected from the group consisting of aluminum compounds, zinc compounds and alkaline earth metal compounds; and said outer second coating layer containing at least one silicon compound.

* * * * *